Aug. 23, 1927.
D. A. RIZER
1,640,252
REFRIGERATOR
Filed Aug. 28, 1922
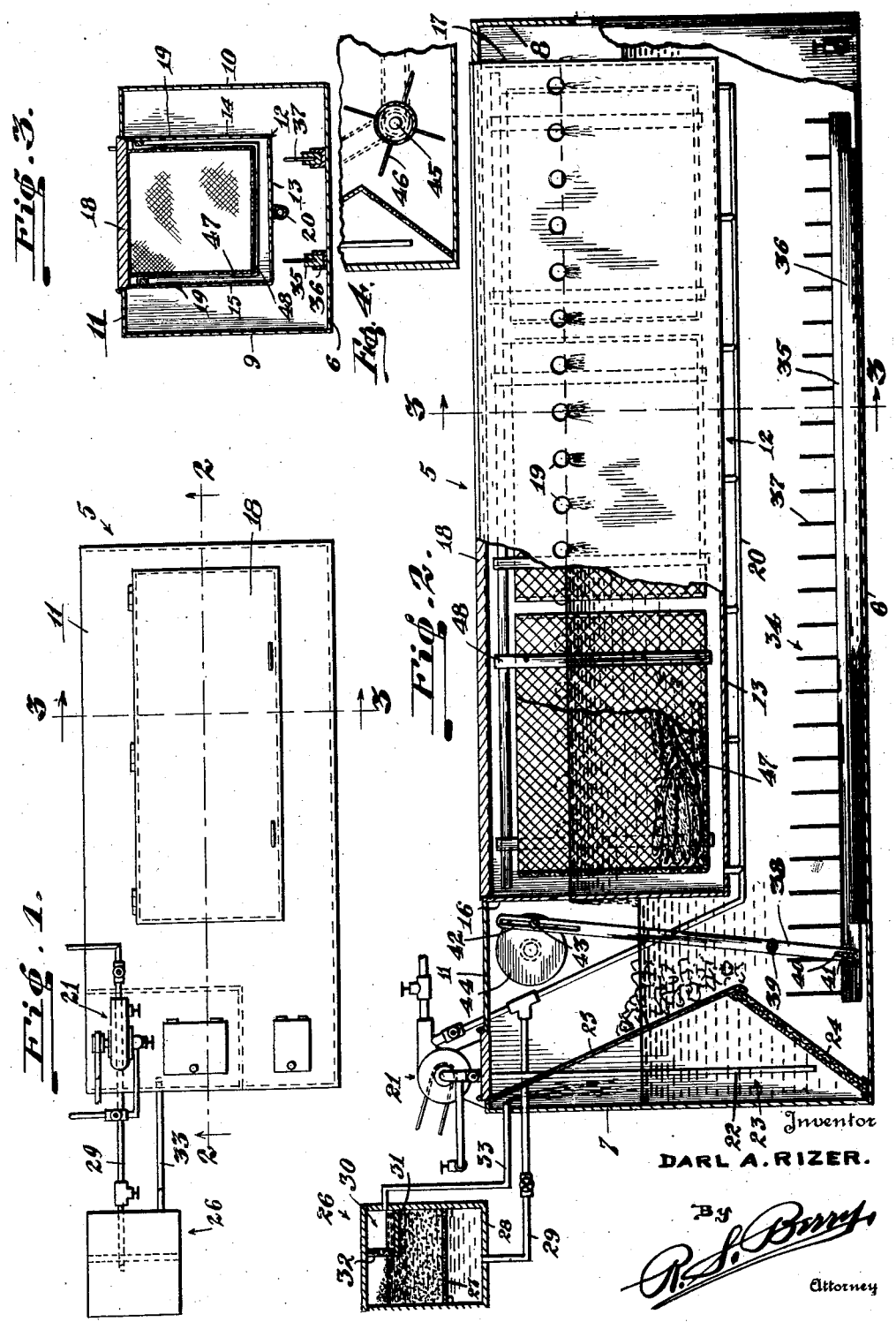
Inventor
DARL A. RIZER.
By
Attorney Patented Aug. 23, 1927.

1,640,252

UNITED STATES PATENT OFFICE.

DARL A. RIZER, OF LOS ANGELES, CALIFORNIA, ASSIGNOR OF ONE-HALF TO EDWARD F. STELLA, OF LOS ANGELES, CALIFORNIA.

REFRIGERATOR.

Application filed August 28, 1922. Serial No. 584,723.

My invention relates to a refrigerating apparatus of the type in which a refrigerating liquid, such as brine, is circulated through a refrigerating chamber.

An object of my invention is to provide a refrigerating apparatus which is especially adapted for use in freezing fish, or other articles, in which the article to be frozen is submerged in the brine, and embodying means whereby the brine may be maintained at such low temperature as to effect a rapid freezing action.

With the foregoing object in view, together with such other objects and advantages as may subsequently appear my invention consists in the parts and the construction, combination and arrangement of parts hereinafter more fully described and claimed, and illustrated in the accompanying drawings, in which:—

Figure 1 is a plan view of the refrigerating apparatus.

Fig. 2 is a view in vertical section as seen on the line 2—2 of Figure 1.

Fig. 3 is a view in transverse section as seen on either line 3—3 of Figure 1 or line 3—3 of Figure 2.

Fig. 4 is a detail in section and elevation illustrating a modified form of agitator.

Referring to the drawings more specifically, 5 indicates a tank of any suitable construction here shown as box-like in form, and having a bottom-wall 6, end-walls 7 and 8, side-walls 9 and 10, and a top-wall or cover 11. Arranged within the tank 5 is a reservoir 12 of a box-like form, having a bottom-wall 13 spaced above the bottom-wall 6 of the tank, and fitted with side-walls 14 and 15, and end-walls 16 and 17, spaced from the side and end-walls of the tank. The reservoir opens through the top of the tank and is fitted with a closure 18 of any suitable construction. The side and end walls of the reservoir are formed in their upper portion with openings 19 which constitute over-flow openings through which brine delivered to the reservoir as later described may flow into the tank. Opening to the lower portion of the reservoir, through a number of outlets, is a pipe 20 leading from the discharge side of a pump 21, the intake of which pump connects with a pipe 22 leading downwardly into the tank 5 and terminating in a screened chamber 23 formed in the tank and here shown as comprising a screen panel 24 extending upwardly at an incline adjacent one end of the tank and connecting at its upper end with an oppositely inclined panel 25 leading to the upper portion of the tank.

A brine filter 26 is provided, comprising a tank formed with a perforated false bottom 27 spaced from the bottom wall 28 of the tank, and leading to the space between the walls 27 and 28 is a pipe 29 connected to the discharge side of the pump 21. Formed in the upper portion of the filter tank is a screen chamber 30 comprising a bottom-wall 31 and a side-wall 32 formed of a screen-panel, and leading from the chamber 30 is a pipe 33 opening to the tank 5 through which brine may be delivered by gravity flow from the brine filter.

Located in the tank 5 beneath the reservoir 12 is an agitator 34 which may be of any suitable construction, and here shown in Figures 2 and 3 as comprising a pair of reciprocal slide-bars 35 mounted to slide longitudinally in guides 36 on the bottom of the tank; the slide-bars being fitted with a series of upwardly extending pins or blades 37 adapted to agitate the liquid in the tank on reciprocation of the bars. Suitable mechanism is provided for actuating the bars, here shown as comprising a vertically extending lever 38 pivoted at 39, havig its lower end formed with a slot 40 engaging a pin 41 on the bar, the upper end of the lever being formed with a slot 42 engaged by a pin 43 on a disc 44 adapted to be rotated from any suitable source of power whereby the lever may be rocked to effect reciprocal movement of the bar. Another form of agitator is illustrated in Figure 4 and comprises a horizontal shaft 45 fitted with blades 46 adapted on rotation of the shaft to effect an agitating action. The shaft 45 may be rotated in any desired manner and any suitable number of such agitators may be provided in the tank as occasion may require.

Mounted in the refrigerating reservoir is a series of screen baskets 47 to receive the articles to be frozen, which baskets are removable and are here shown as supported by hangers 48.

In the operation of the invention a brine of suitable strength and quantity is placed in the tank 5, together with a quantity of crushed ice, the articles to be frozen are placed in the baskets within the reservoir 12, and the pump and agitator are set in operation. The pump acts to draw brine from the chamber 23 through the pipe 22 and to deliver a portion of the brine to the reservoir through the pipe 20 to fill the reservoir to the overflow openings and also to deliver a portion of the brine through the pipe 29 to the brine filter 26; the ice being screened from the brine in the chamber 23 by the screen-panel 24. The pump is maintained in constant operation so that there will be a continuous flow of brine through the reservoir and in and around the articles contained in the latter; the excess brine in the reservoir being discharged back into the tank through the over-flow openings 19. A portion of the brine will also be caused to flow continuously through the brine filter, being delivered to the latter by the pump from the chamber 23 and caused to flow back into the chamber 23 through the pipe 33 after having passed through the brine filter.

The agitator is kept in constant operation and acts to insure distribution of the ice through the brine beneath the reservoir and to quicken melting of the ice so as to maintain the brine at a low temperature.

When it is desired to increase the strength of the brine salt is added thereto, and, when it is desired, to decrease the temperature of the brine crushed ice is fed into the tank as occasion may require.

It has been found that by the use of this apparatus a zero temperature may be obtained which insures a rapid freezing action on the article to the refrigerating reservoir.

The heat radiating from the articles in the reservoir tends to raise the temperature of the brine in the reservoir, but the reservoir 12 being partly submerged in the refrigerant of ice and brine in the tank, the cold generated by the melting of the ice in the tank will serve to cool the reservoir and aid in maintaining the refrigerant in the reservoir at a low temperature.

The brine discharged from the reservoir on being delivered back into the ice and brine in the tank is restored to the low temperature of the refrigerant in the tank, and by reason of the brine delivered to the reservoir being passed through a conduit submerged in the ice and brine in the tank, the brine entering the reservoir will be of the low temperature of that in the tank, which in practice will be 0° Farenheit.

I claim:—

1. In a refrigerating apparatus, a tank containing a refrigerant of ice and brine, a refrigerating reservoir submerged in the refrigerant in said tank, a pump, an intake pipe leading from the tank to the pump, and a discharge conduit leading from said pump through the refrigerant in the tank and communicating with the reservoir, said reservoir being formed with overflow apertures opening to said tank.

2. In a refrigerating apparatus, a tank containing a refrigerant of ice and brine, a refrigerating resevoir submerged in the refrigerant in said tank, a pump, an intake pipe leading from the tank to the pump, a discharge conduit leading from said pump through the refrigerant in the tank and communicating with the reservoir, said reservoir being formed with overflow apertures opening to said tank, a brine filter, a pipe leading from the discharge conduit to said filter, and an overflow pipe leading from said filter to said tank.

3. In a refrigerating apparatus, in combination, a container adapted to house a refrigerant and materials for maintaining it at full saturation and at a freezing temperature, one or more tanks suspended in said container and adapted to house a portion of said refrigerant, means associated with said container and said tank or tanks whereby a continuous circulation may be maintained therebetween, and means associated with said last mentioned means for rendering the same effective.

DARL A. RIZER.